United States Patent [19]

Clarke et al.

[11] 4,390,644
[45] Jun. 28, 1983

[54] ISOCYANURATE FOAMS USING A SULFONIUM ZWITTERION/METAL CARBONYLATE MIXTURE AS CATALYST

[75] Inventors: Donald H. Clarke, Essexville; George J. Pomranky; Donald L. Schmidt, both of Midland, all of Mich.

[73] Assignee: The Dow Chemical Company, Midland, Mich.

[21] Appl. No.: 264,503

[22] Filed: May 18, 1981

[51] Int. Cl.$^3$ .............. C08G 18/14; C08G 18/16; C08G 18/58; C08G 18/65
[52] U.S. Cl. .................... 521/121; 521/117; 521/137; 521/902; 528/48; 549/78
[58] Field of Search ............ 521/902, 117, 121, 137; 528/48; 549/78

[56] References Cited

U.S. PATENT DOCUMENTS

| 3,516,950 | 6/1970 | Haggis | 260/2.5 |
|---|---|---|---|
| 3,636,052 | 1/1972 | Hatch et al. | 260/332.3 R |
| 3,660,431 | 5/1972 | Hatch et al. | 260/332.3 R |
| 3,723,367 | 3/1973 | Chow et al. | 521/117 |
| 3,749,737 | 7/1973 | Hatch et al. | 260/332.3 R |
| 3,749,738 | 7/1973 | Hatch et al. | 260/332.3 R |
| 3,749,739 | 7/1973 | Hatch et al. | 260/332.3 R |
| 3,940,517 | 2/1976 | De Leon | 427/373 |
| 4,089,877 | 5/1978 | Klingler et al. | 260/332.3 R |
| 4,111,914 | 9/1978 | Kresta | 528/48 |
| 4,169,921 | 10/1979 | Moss et al. | 521/125 |
| 4,173,692 | 11/1979 | Eldridge | 521/125 |
| 4,256,802 | 3/1981 | Koehler et al. | 521/902 |
| 4,256,846 | 3/1981 | Ohashi | 521/117 |

Primary Examiner—H. S. Cockeram
Attorney, Agent, or Firm—M. S. Jenkins; D. R. Howard

[57] ABSTRACT

Stable isocyanurate foams are produced at rapid reaction rates by contacting an organic polyisocyanate with an active hydrogen compound such as a polyether polyol in the presence of an initiator comprising an ortho-sulfonium phenoxide and a carbonylate salt such as sodium acetate.

18 Claims, No Drawings

ISOCYANURATE FOAMS USING A SULFONIUM ZWITTERION/METAL CARBONYLATE MIXTURE AS CATALYST

BACKGROUND OF THE INVENTION

This invention relates to rigid polyisocyanurate cellular compositions and to processes for preparing them using a combination of catalysts.

As is well-known, the polyurethane foams, particularly the rigid polyisocyanurate foams, are excellent thermal insulators in a wide variety of applications, especially in the refrigerant and construction applications. In the production of such foams, the cellular polyurethane is made by reacting an isocyanate with a polyol or other active hydrogen compound having a plurality of active hydrogen groups. Generally, such reactions were carried out in a formulation also containing a blowing agent and a surfactant in addition to the aforementioned reactants and a catalyst. By proper choice of isocyanate and polyol, foams can be made with properties ranging from flexible to semi-rigid to rigid.

Unfortunately, the flammability and smoke evolutionary characteristics of polyurethane foams have significantly limited use of such foams in many applications. Conventionally, the tendency of such foams to burn is reduced by the addition of halogenated organic materials or combinations thereof with phosphorus compounds to a polyurethane formulation. More recently, polyurethanes having improved flame and heat resistance (hereinafter called "thermal stability") have been made by introducing more isocyanurate groups into the polyurethane network. In addition to high thermal stability, such isocyanurate foams also exhibit hydrolytic and dimensional stability.

Such foams are normally produced by the employment of so-called trimerization catalysts in combination with conventional urethane catalyst in the urethane formulation. Exemplary trimerization catalysts include amine catalysts such as 2,4,6-(N,N-dimethylaminomethyl)phenol, hexahydrotriazenes, metal alkoxides, metal carboxylates and the like. Unfortunately, relatively large amounts are required to produce the desired trimerization required for the preparation of isocyanurate foams. The presence of such larger amounts of catalysts, particularly the amine or metal catalysts, often cause degradation when the resulting foam is subjected to elevated temperatures. Some catalysts, particularly the alkali metal carboxylates, yield foams which are so friable that they exhibit little, if any, resistance to impact and abrasion. More recently, as taught in U.S. Pat. No. 4,111,914, isocyanurate foams exhibiting reduced friability have been prepared from stable isocyanurate oligomers formed in the presence of sulfonium zwitterions. While such isocyanurate foams exhibit many desirable properties as compared to conventional isocyanurate foams, further improvements in reaction rates, processability, impact and abrasion resistance are desired.

In view of the aforementioned difficulties with the conventional catalysts employed and the reactions of isocyanates, it is highly desirable to provide a process for preparing polyurethane foams containing substantial isocyanurate moieties, wherein such foams exhibit good thermal resistance as well as good control of impact and abrasion resistance. In addition, it is desirable that improvements in reaction rates and processability be achieved by such process.

SUMMARY OF THE INVENTION

The present invention is a process providing a stable isocyanurate foam at a reaction rate faster than that achieved in the presence of aromatic sulfonium zwitterions as the sole catalyst. This process comprises reacting a polyisocyanate with a compound having a plurality of active hydrogen moieties in the presence of an ortho-sulfonium zwitterion (as defined hereinafter) and a carbonylate salt (as defined hereinafter) in amounts which are sufficient to promote the formation of an isocyanurate polymer. Advantageously, a conventional blowing agent is employed in the aforementioned process to produce an isocyanurate foam. Surprisingly, the isocyanurate foams produced in the practice of this invention are produced at rates faster than those achieved in the presence of equivalent amounts of the sulfonium zwitterion. In addition, the aforementioned process is easier to practice (i.e., more processable) and better control over impact resistance and friability is achieved.

The isocyanurate foams produced in the practice of the present invention are useful as insulation, roofing materials, and panel cores.

DESCRIPTION OF ILLUSTRATIVE EMBODIMENTS

The ortho-sulfonium zwitterions employed as one of the catalyst components in the practice of this invention are characterized by an aromatic ring structure bearing an anion such as oxide and a cationic sulfonium group wherein the anion and sulfonium group are in an ortho relationship to each other on the aromatic ring. In addition, the zwitterion has sufficient hydrophobicity to form a thermodynamically stable mixture when dispersed in the isocyanate used to prepare the isocyanurate foam. Such thermodynamically stable mixtures form spontaneously and include (1) true solutions wherein the individual zwitterion molecules are dispersed as well as (2) micellar or colloidal dispersions or solutions wherein the zwitterion molecules are aggregated to some extent. Preferably, such ortho zwitterions are those corresponding to the formula:

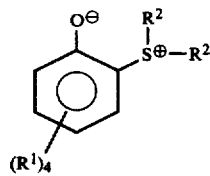

wherein each $R^1$ is independently a suitable inert monovalent radical capable of existing as a substituent on the benzene ring provided that at least one of such radicals is a hydrophobic radical containing at least 4 carbons, each $R^2$ is independently an inert monovalent organic radical and/or two of $R^2$ are collectively a suitably inert divalent organic radical capable of forming a heterocyclic ring with $$-\underset{\oplus}{\text{S}}-.$$

$R^1$ is a suitably inert monovalent radical which is capable of existing as a substituent on the benzene ring. Examples include H, OH, R', —OR', —SR', wherein R' is hydrocarbyl or substituted hydrocarbyl. Hydrocarbyl is a hydrocarbon radical having from 1 to 20 carbons, preferably alkyl, cycloalkyl, alkenyl, aryl, alkylaryl, aralkyl and similar hydrocarbon radicals having 1 to 8 carbons. Exemplary substituents of substituted hydrocarbyl include X, OH, —OR', —SR' and the like wherein X and R' are as defined hereinbefore. Examples of the inert hydrophobic monovalent radical which at least one $R^1$ must be, include $C_4-C_{20}$ alkyl, $C_4-C_8$ alkoxy, hydroxyl and the like. Preferably, $R^1$ is hydrogen, hydroxyl, $C_4-C_{20}$ alkyl, $C_1-C_8$ alkoxy with hydrogen and $C_8-C_{12}$ alkyl being especially preferred. It is understood that the use of more than one $R^1$ group other than hydrogen, particularly very bulky groups such as higher hydrocarbyls, will be limited as necessary to ensure formation of a stable ar-sulfonium arenol salt as well as the corresponding sulfonium zwitterion.

Individually, each $R^2$ is an inert monovalent organic radical such as hydrocarbyl or substituted hydrocarbyl as set forth in the definition of $R^1$. Suitable examples include alkyl, aryl, cycloalkyl, alkylaryl, alkaryl, alkylthioalkyl, alkoxyalkyl, hydroxyalkyl and the like. Preferred are $C_6-C_8$ aryl such as phenyl or tolyl or $C_1-C_8$ alkyl wherein the carbons in the position alpha to

are preferably methylene or methyl, provided that only one of $R^2$ is a group larger than ethyl. Examples of preferred alkyls include methyl, ethyl, propyl, butyl or octyl with the most preferred being the $C_1-C_4$ alkyls.

The cyclic sulfonium zwitterions wherein the $R^2$ groups are collectively a divalent radical (—$R^2R^2$—) are generally less desirable than the noncyclic sulfonium zwitterions wherein each $R^2$ is individually monovalent radicals. Collectively, the $R^2$ groups are suitably inert divalent organic radicals that are capable of forming a heterocyclic ring with divalent sulfur of the type described in U.S. Pat. No. 4,111,914, which is hereby incorporated by reference in its entirety. Of the cyclic sulfonium zwitterions, the 5- or 6-membered ring sulfonium moieties are preferred, with the 5-membered ones being most preferred. In all suitable —$R^2R^2$—, the two carbons of —$R^2R^2$— bonded to

are methylene. Exemplary hydrocarbylenes and heterohydrocarbylenes include alkylene, cycloalkylene, alkenylene, alkylenearylenealkylene, alkyleneoxyalkylene and alkylenethioalkylene. Exemplary suitable substituents of substituted hydrocarbylene and heterocarbylene include monovalent radicals given in the definition of $R^1$ such as OH, R', —OR' and —SR' where R' is hydrocarbyl, preferably alkyl or aryl. Preferably, the $R^2$ groups are collectively the substituted or unsubstituted hydrocarbylenes such as —$(CH_2)_4$—, —$(CH_2)_3$—,

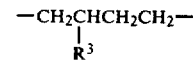

wherein $R^3$ is $C_1-C_4$ alkyl or aryl (e.g., phenyl or alkaryl such as tolyl).

In the aforementioned preferred zwitterions, the sulfonium moiety is necessarily substituted in a ring position on the benzene ring that is ortho to the anionic moiety and at least one ring position is occupied by a hydrophobic inert radical having at least 4 carbons.

Examples of the preferred sulfonium zwitterions include those represented by the following formula:

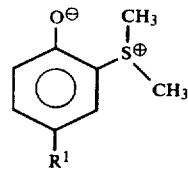

wherein $R^1$ is t-butyl, nonyl, dodecyl or similar $C_4-C_{20}$ alkyl, with dodecyl and similar $C_8-C_{12}$ alkyl being most preferred. Examples of preferred zwitterions also include mixtures of two or more of the aforementioned zwitterions.

Examples of suitable but less preferred zwitterions include those represented by the following formula:

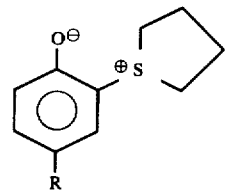

wherein R is as defined in the preceding preferred examples.

The aforementioned zwitterions are suitably prepared by the methods and procedures described in U.S. Pat. No. 4,089,877.

The second component of the catalyst is a carbonylate salt such as an ammonium or metal salt of a carboxylate, carbonate or bicarbonate wherein the metal is an alkali metal such as lithium, sodium, cesium or potassium and the like; the ammonium cation is represented by the formula $NR''_4$ wherein each R" is individually hydrogen or $C_1-C_4$ alkyl; and the carboxylate is a derivative of a carboxylic acid containing 1 to 20 carbon atoms. Examples of such carbonylates include carbonates and bicarbonates. Also included are carboxylates such as acetate, propionate, butyrate, valarate, hexanoate, heptanoate and other saturated acids containing up to 20 carbons; unsaturated carboxylates derived from tolyls or animal fats such as oleate or linoleate; polycarboxylates such as oxalate, malenate, succinate, adipate, fumarate, terephthalate and isophthalate. Of the foregoing carbonylates, the alkali metal and ammonium salts of lowr aliphatic carboxylates such as potassium acetate, tetramethylammonium acetate and sodium propionate are preferred, with carboxylates of potassium such as potassium acetate being especially preferred.

The cellular isocyanurate polymers which are prepared in accordance with this invention comprise the reaction product of an organic polyisocyanate with itself or a similar organic polyisocyanate to form a polyisocyanurate, modified by the reaction of a fraction of the polyisocyanate and/or polyisocyanurate with a compound having a plurality of active hydrogen groups that will react via a condensation reaction with isocyanate moieties of the organic polyisocyanate and isocyanate groups of the polyisocyanurate.

The organic polyisocyanates which are advantageously employed either alone or as mixtures in the present invention can be represented by the formula:

$$R(NCO)_z$$

wherein R is a polyvalent organic radical and z is an integer of 2 or more that corresponds to the valence number of R. Preferably, z is 2–4, most preferably 2–3. Exemplary R include alkyl, cycloalkyl, aralkyl, aryl and other hydrocarbyl groups. Representative organic polyisocyanates suitably employed include, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; aromatic triisocyanates such as tris(4-isocyanatophenyl)methane; 2,4,6-toluene trisisocyanates; the aromatic tetraisocyanates, such as 4,4'-dimethyldiphenylmethane-2,2',5,5'-tetraisocyanate and the like; alkylaryl polyisocyanates such as xylene diisocyanate; aliphatic polyisocyanates such as hexamethylene-1,6-diisocyanate; ethylene diisocyanate, dicyclohexyl and methane-4,4'-diisocyanate and mixtures thereof. Other organic polyisocyanates include polymethylene polyphenyl isocyanate, hydrogenated methylene diphenylisocyanate, m-phenylene diisocyanate, naphthylene-1,5-diisocyanate, 1-methoxyphenyl-2,4-diisocyanate, diphenylmethane-4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, isophorone diisocyanate, 1,3-bis-(isocyanatomethyl)benzene, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanatodiphenylether, 5,6-dimethyl-1,3-phenylene diisocyanate, 2,4-dimethyl-1,3-phenylene diisocyanate, 4,4-diisocyanatodiphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6'-dimethyl-4,4'-diisocyanatodiphenyl and mixtures thereof. Also suitable are polyisocyanates of higher functionality such as dimers and particularly NCO-terminated oligomers of isocyanates containing isocyanate rings as well as prepolymers and mixtures of the aforementioned isocyanates. Also suitable are those sometimes referred to as quasi-prepolymers of such isocyanates prepared by reacting an excess of isocyanate with an active hydrogen compound such as a polyol, preferably those made by reacting at least 2 moles of an isocyanate group with one mole of active hydrogen.

Of these polyisocyanates, the polymethylene polyphenylisocyanate isomers are most preferred especially those having an isocyanate functionality in the range from about 2.0 to about 3.2 and an equivalent weight from about 130 to about 250.

These polyisocyanates are prepared by conventional methods known in the art such as phosgenation of the corresponding organic polyamine.

The active hydrogen compound (hereinafter called "polyahl") suitably employed in the preparation of the adduct includes any polyfunctional compound having at least two active hydrogen moieties. For the purposes of this invention, an active hydrogen moiety refers to a moiety containing a hydrogen atom which, because of its position in the molecule, displays significant activity according to the Zerewitnoff test described by Kohler in the *Journal of American Chemical Society*, Vol. 49, page 3181 (1927). Illustrative of such active hydrogen moieties are —COOH, —OH, —NH$_2$, =NH, —CONH$_2$, —SH, —CONH—.

Typical polyahls include polyols, polyamines, polyamides, polymercaptans, polyacids and the like, particularly as exemplified in U.S. Pat. No. 3,887,501. Examples of suitable hydroxyl compounds are the following (including mixtures thereof): the polyols such as polyether polyols, the polyester polyols, homopolymers and copolymers of hydroxyalkyl acrylates and methacrylates, polyepoxide resins, phenol-formaldehyde resins, polyhydroxy terminated polyurethane polymers, polyhydroxyl-containing phosphorus compounds and alkylene oxide adducts of polyhydric thioethers, acetals including polyacetals, aliphatic and aromatic polyols and thiols including polythioethers, polyammonium compounds and polyamines including aromatic, aliphatic and heterocyclic polyamines including mixtures thereof. Alkylene oxide adducts of compounds which contain two or more different groups within the aforementioned classes may also be used such as amino alcohols which contain an amino group and a hydroxyl group. Also, alkylene adducts of compounds which contain one —SH group and one —OH group as well as those which contain an amino group and a —SH group may be used.

Polyether polyols which are more preferably employed as the polyahl in the practice of this invention are the polyalkylene polyether polyols, e.g., diols such as ethylene glycol, propylene glycol, butylene glycol, diethylene glycol and trimethylolpropane. Exemplary alcohols that are advantageously employed in making the polyether polyol include methanol, ethanol, ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, sorbitol and other of the various alcohols mentioned in U.S. Pat. No. 4,928,299 as well as sugars such as sucrose, glucose and fructose and the like. Also included within the term "alcohol" are compounds derived from phenol such as 2,2-(4,4'-hydroxyphenyl)propane, commonly known as bisphenol A. Illustrative alkylene oxides that are advantageously employed in the preparation of the polyether polyol include ethylene oxide, propylene oxide, butylene oxide, amylene oxide and random or block copolymers of two or more of these oxides; glycidol; glycidyl ethers or thioethers such as methyl glycidyl ethers, t-butyl glycidyl ether and phenyl glycidyl ether. The polyalkylene polyether polyols may be prepared by any known process such as, for example, the process disclosed by Wurtz in 1859 and *Encyclopedia of Chemical Technology*, Vol. 7, pp.

257-262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,973; 3,058,921; 2,871,219 and British Patent No. 898,306. Polyether polyols which are most preferred include diethylene glycol, dipropylene glycol and other polyalkylene glycols having weight average molecular weight ($M_w$) up to about 6000 including glycerine initiated polyethers of ethylene oxide and/or propylene oxide having $M_w$ in the range from about 2200 to about 6000 sucrose initiated polyethers of ethylene oxide and/or propylene oxide having $M_w$ in the range from about 300 to about 1500.

The polyester polyols, which are as preferred as the polyether polyols, are reaction products of polycarboxylic acid and alcohols particularly polyhydric alcohol. Of particular interest are the polyoxyalkylene esters such as the polyoxyethylene esters and the polyoxypropylene esters. Examples of suitable polycarboxylic acids include oxalic acid, malonic acid, succinic acid, glutaric acid, adipic acid, pimelic acid, maleic acid, fumaric acid, glutaconic acid, α-hydromuconic acid, β-hydromuconic acid, α-butyl-α-ethyl-glutaric acid, α,β-diethyl-succinic acid, isophthalic acid, terephthalic acid, hemimellitic acid and 1,4-cyclohexane-dicarboxylic acid. Any suitable alcohol including both aliphatic and aromatic may be used. Examples of suitable alcohols are those polyhydric alcohols described hereinbefore. Also included with the term "polyhydric alcohol" are compounds derived from phenol such as 2,2-(4,4'-hydroxyphenyl)propane, commonly known as bisphenol A; polyacetone polyols and the like.

Other polyahls suitably employed include polyalkylene polyamines such as ethylenediamine; amino alcohols such as amino ethanol; esters of phosphoric, sulfonic and boric acids; cellulose-like polymers such as starch and methyl cellulose; peptides and polypeptides; methylol resins such as urea-formaldehyde and melamine-formaldehyde; lactone polyols prepared by reacting a lactone such as ε-caprolactone or a mixture of ε-caprolactone and an alkylene oxide with a polyfunctional initiator such as a polyhydric alcohol, an amine or an amino alcohol; the polymer/polyols produced by the in situ polymers of a vinyl monomer in a polyol, as disclosed in U.S. Pat. Nos. 3,304,273; 3,383,351 and 3,523,093.

Of the foregoing polyahls, the polyalkylene ether diols such as ethylene glycol, diethylene glycol, triethylene glycol, ethoxylated glycerine polyether diols of ethylene oxide and/or propylene oxide having $M_w$ up to 300 are more preferred, with diethylene glycol being most preferred.

In preparing the cellular isocyanurate polymer, the foam formulation contains amounts of polyisocyanate and polyahl sufficient to yield an isocyanurate foam having a friability as determined by ASTM C-421 of 35 weight percent loss or less, preferably less than 30, most preferably less than 25, weight percent loss. Advantageously, the equivalent ratio of polyisocyanate to polyahl is preferably in the range from about 1 to 8:1, more preferably from about 2 to about 6:1 and most preferably from about 2 to about 4:1. The zwitterion is employed in amounts sufficient to initiate the isocyanurate reaction as well as the urethane reaction. Preferably, such amounts are in the range of from about 0.0002 to about 0.028 equivalent of zwitterion per equivalent of isocyanate group, more preferably from about 0.0005 to about 0.021 equivalent of zwitterion and most preferably from about 0.001 to about 0.015 equivalent of zwitterion. The amount of metal carbonylate employed is that amount which is sufficient to accelerate the formation of isocyanurate as compared to the use of the zwitterion alone. Preferably, the metal carbonylate is employed in an amount from about 0.2 to about 2.3 equivalents of carbonylate per equivalent of zwitterion, more preferably from about 0.3 to about 2 equivalents of carbonylate, most preferably from about 0.4 to about 1.1 equivalents of carbonylate.

In addition to the previously disclosed polyisocyanate, polyol, zwitterion and carbonylate reagents, other ingredients such as surfactants and blowing agents are advantageously included. Blowing agents suitably employed include those characteristically used in the preparation of rigid polyurethane foams and are, in general, liquids having a boiling point between $-50°$ C. and $+100°$ C., preferably between $0°$ C. and $50°$ C. Examples of such blowing agents include chlorinated and fluorinated hydrocarbons such as fluorotrichloromethane, 1,1,2-trichloro-1,2,2-trifluoroethane, and 1,1-dichloro-1,2,2,2-tetrafluoroethane, methylene chloride, ethylene chloride, dichlorodifluoromethane and the like with trichlorofluoromethane being preferred. Water may be used as a supplemental blowing agent in combination with the aforementioned halohydrocarbon. The use of water as a blowing agent in urethane chemistry is described in Saunders and Frisch, *Advances in Polyurethane Chemistry*, Technomic Publishing Co., Vol. 1, 76 (1971).

The blowing agents are employed in amounts sufficient to give the resulting foam the desired bulk density, generally from about 1.2 to about 3 lbs/ft$^2$. Accordingly, the blowing agent preferably constitutes from about 7 to about 18, most preferably from about 13 to about 15, weight percent of the formulation.

Surfactants advantageously employed include reaction products of polysiloxanes and alkylene oxides such as ethylene oxide and propylene oxide, e.g., polydimethylsiloxanes, polyoxyalkylene block copolymers, alkoxysilanes, polysilylphosphinates, and the like. Other examples of surfactants include block copolymers of polysiloxane and polyalkylene oxide, alkylaryl siloxanes, and other organosilicons. The surfactant is normally employed in an amount sufficient to stabilize bubbles resulting from the blowing agent until the foam has achieved sufficient strength to avoid collapse. Preferably, such surfactants are employed in amounts from about 0.5 to about 2, more preferably from about 0.5 to about 1, weight percent based on the weight of the entire foam formulation.

In preferred embodiments, it is desirable to include compounds containing oxirane groups in the polyahl, particularly when the polyahl is a polyol. Examples of such oxiranes include propylene oxide, phenyl glycidyl ether, the diglycidyl ether of 2,2-bis-(4-hydroxylphenyl)propane and various epoxy resins. When used such oxiranes are employed in amounts in the range from about 5 to 10, especially 2 to 4, weight percent based on the weight of the foam formulation.

In addition to the aforementioned ingredients of the foam formulation, other substances such as fillers, dyes, pigments, cross-linking agents, chain extenders, flame retarding agents and smoke suppressing agents may be employed in a manner similar to their use in conventional isocyanurate foams.

The procedures used to prepare the foams of the present invention are suitably described in U.S. Pat. Nos. 3,516,950; 4,111,914 and 3,723,367. As might be expected, ordinary temperatures and pressures are employed in the foam process which may range from about 0° to about 250° C., preferably from about 20° to about 200° C., at atmospheric to above atmospheric pressure as well as below atmospheric pressure.

It is desirable to dissolve the zwitterion initiator and the carboxylate accelerator in a reactive solvent prior to contacting it with isocyanate. Suitable solvents are those materials that react with the isocyanate and dissolve appreciable amounts of the zwitterion, e.g., at least enough to provide a 10 weight percent solution of zwitterion (preferably from 10 to 50 weight percent) and an appreciable amount of carboxylate, e.g., at least enough to provide a 10 weight percent solution of carboxylate (preferably from 20 to 35 weight percent) and do not react with the zwitterion or the carboxylate. Advantageously, the solvents are polyahls as described hereinbefore. The solution of zwitterion and carboxylate is combined with the reagents of a formulation other than the isocyanate with rapid agitation to ensure an essentially homogeneous formulation. The resulting composition is then thoroughly blended with the polyisocyanate after which it is applied to a substrate or is poured into a suitable mold or other container wherein simultaneous polymerization and expansion or blowing occurs.

The following example is given to illustrate the invention and should not be construed as limiting its scope. Unless otherwise indicated, all parts and percentages are by weight.

EXAMPLE

An isocyanurate foam formulation is prepared by combining 35.9 g of diethylene glycol, 10 g of an epoxy resin based on bisphenol A and epichlorohydrin and sold by The Dow Chemical Company under the trademark D.E.R. 330 Epoxy Resin, 3 g of a silicone surfactant sold by Dow Corning under the trade designation DC 193, 2 g of a sulfonium zwitterion represented by the structural formula:

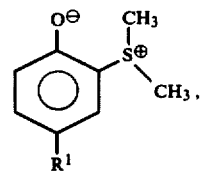

wherein $R^1$ is t-butyl (TC$_4$), 1 g of potassium acetate and 30 g of trichlorofluoromethane (Freon 11). These components are mixed together for one minute on a multiple blade, high speed blender and then 280 g of polymethylene polyphenyl isocyanate having a functionality of 2.6 and an equivalent weight of 134 is added to the formulation. The resulting formulation is mixed for five seconds on the blender and then poured into a container. At room temperature, the foam rises and is tack free to the touch in 25 seconds. The resulting foam is cured by maintaining at room temperature for 24 hours. The foam (Sample No. 1) is removed from the container and is tested for physical properties, insulative properties and flame resistance. Results of these tests are reported in Table I.

Several other suitable zwitterions and carboxylate salts are employed as catalysts in the foregoing procedure except that the amount of Freon 11 is varied from 30–60 g (7.8 percent to 13.0 percent based on the formulation). The resultant foams (Sample Nos. 2–12) are tested and the results of these tests are also reported in Table I.

For purposes of comparison, conventional catalysts are similarly employed to prepare foams (Sample Nos. C$_1$–C$_2$). The foams are tested and the results are reported in Table I.

TABLE I

| Sample No. | Zwitterion (1) Type | Zwitterion (1) Amt., Wt % | Carboxylate Salt (2) Type | Carboxylate Salt (2) Amt., Wt % | Tack Free Time (3), Sec. | Density (4), lbs/ft$^2$ | Friability (5), % wt loss | Compressive Strength (6) lbs/in$^2$ | K Factor (7) Btu/-ft$^2$/in/°F./hr |
|---|---|---|---|---|---|---|---|---|---|
| 1 | TC$_4$SZ | 0.57 | " | 0.28 | 25 | 1.87 | 15.3 | 27.0 | 0.127 |
| 2 | " | 0.78 | " | 0.13 | 50 | 1.97 | 18.1 | 21.3 | 0.108 |
| 3 | " | " | " | 0.20 | 35 | 1.91 | 9.4 | 18.8 | 0.107 |
| 4 | " | " | " | 0.26 | 25 | 1.81 | 5.4 | 28.7 | 0.120 |
| 5 | " | 0.52 | " | 0.13 | 50 | 1.81 | 9.5 | 15.6 | 0.117 |
| 6 | " | " | " | 0.26 | 30 | 1.94 | 14.6 | 24.7 | 0.117 |
| 7 | C$_{12}$SZ | 0.78 | KAc | 0.13 | 120 | 1.69 | 6.5 | 17.4 | 0.100 |
| 8 | " | " | " | 0.26 | 30 | 1.52 | 13.0 | 16.8 | 0.113 |
| 9 | " | " | " | 0.52 | 25 | 1.60 | 34.4 | 17.2 | 0.120 |
| 10 | " | " | " | 0.26 | 40 | 1.85 | 14.8 | 31.4 | 0.095 |
| 11 | C$_9$SZ | 0.78 | " | 0.26 | 28 | 1.80 | 11.4 | 24.3 | 0.112 |
| 12 | TC$_4$SZ | 0.52 | KOct | 0.34 | 22 | 1.78 | 50.0 | 17.7 | 0.122 |
| C$_1$* | DMP-30 | 0.52 | " | 0.26 | 45 | 1.99 | 42.0 | 26.7 | 0.232 |
| C$_2$* | " | 0.52 | " | 0.52 | 29 | 1.90 | 40.7 | 24.3 | 0.118 |

*Not an example of the invention.
(1) C$_{12}$SZ - the zwitterion of the aforementioned formula where $R^1$ is dodecyl.
TC$_4$SZ - the zwitterion represented structural formula of this example wherein $R^1$ is t-butyl
C$_9$SZ - the zwitterion of the aforementioned formula wherein $R^1$ is nonyl.
DMP-30 - conventional amine catalyst
Weight percent of zwitterion is based on weight of entire formulation.
(2) KAc - potassium acetate wherein weight percent of KAc is based on the entire formulation.
KOct - potassium octoate wherein weight percent of KOct is based on the entire formulation.
(3) Time in seconds until foam becomes non-tacky to human touch.
(4) ASTM D-1622
(5) ASTM C-421
(6) ASTM D-1621
(7) ASTM C-518

As evidenced by the data of Table I, the catalyst composition of the present invention yields an isocyanurate foam having a friability and/or a tack free time generally less than those produced in the presence of conventional amine catalysts.

What is claimed is:

1. A process for preparing a foamed polymer having isocyanurate moieties and moieties that are adducts of isocyanate moieties and active hydrogen moieties, which comprises reacting an organic polyisocyanate having a plurality of isocyanate moieties or a mixture of organic polyisocyanates with (a) an active hydrogen compound having a plurality of active hydrogen moieties and (b) a compound containing oxirane groups in the presence of a blowing agent and a catalyst, the catalyst comprising an ortho-sulfonium phenoxide, which is soluble in the polyisocyanate or mixture of polyisocyanates, and a carbonylate salt, under conditions such that the phenoxide and the carbonylate salt initiate reaction of the active hydrogen compound, the compound containing oxirane groups and the polyisocyanate or mixture of polyisocyanates to form a foamed polymer having isocyanaurate moieties and adducts of isocyanate moieties and active hydrogen moieties.

2. The process of claim 1 wherein the ortho-sulfonium phenoxide has a benzene ring that bears an oxygen anion, a sulfonium group and a monovalent organic radical having from 4 to 20 carbon atoms.

3. The process of claim 1 wherein the phenoxide is represented by the formula:

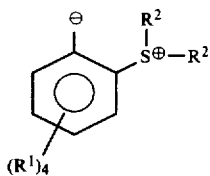

wherein each $R^1$ is independently a suitably inert monovalent radical capable of existing as a substituent on the benzene ring provided that at least one $R^1$ is an organic radical containing at least four carbon atoms; and each $R^2$ is independently a suitably inert monovalent radical and/or two of $R^2$ are collectively a suitably inert divalent organic radical capable of forming a heterocyclic ring with $S^+$.

4. The process of claim 1 wherein one of $R^1$ is alkyl having from 4 to 20 carbons and each of the remaining $R^1$ groups is hydrogen and each $R^2$ is individually alkyl having from 1 to 10 carbon atoms provided that at least one of $R^2$ is methyl or ethyl.

5. The process of claim 1 wherein the organic polyisocyanate is a polymethylene polyphenyl isocyanate.

6. The process of claim 1 wherein the carbonylate salt is an alkali metal or ammonium carboxylate in which the carboxylate has from 2 to 5 carbon atoms.

7. The process of claim 6 wherein the carbonylate salt is potassium acetate.

8. The process of claim 1 wherein the carbonylate salt is employed in an amount sufficient to provide a stable foam at a reaction rate faster than that achieved in the presence of equivalent amounts of the ortho-sulfonium phenoxide as the sole catalyst.

9. The process of claim 2 wherein the sulfonium group is non-cyclic.

10. The process of claim 1 wherein the active hydrogen compound is selected from the group consisting of polyethers, polyols, polyester polyols, polyamines, polyamides, polymercaptans and polyacids.

11. The process of claim 1 wherein the active hydrogen compound is a polyalkylene polyether polyol having a weight average molecular weight of up to than about 6,000 selected from the group consisting of ethylene glycol, propylene glycol, butylene glycol, diethylene glycol and trimethylol propane.

12. The process of claim 11 wherein the polyalkalene polyether polyol is diethylene glycol.

13. The process of claim 1 wherein the compound containing oxirane groups is selected from the group consisting of propylene oxide, phenyl glycidyl ether, the diglycidyl ether of 2,2-bis-(4-hydroxylphenyl)propane and epoxy resins.

14. The process of claim 13 wherein the compound containing oxirane groups is an epoxy resin based on bisphenol A and epichlorohydrin.

15. The process of claim 1 wherein an equivalent ratio of polyisocyanate to active hydrogen compound is from about 1 to 1 to about 8 to 1.

16. A composition comprising the following components: (1) inorganic polyisocyanate having a plurality of isocyanate moieties or a mixture of polyisocyanates, (2) an active hydrogen compound having a plurality of active hydrogen moieties, (3) a compound containing oxirane groups, (4) a blowing agent, (4) a surfactant and (6) an initiator comprising an ortho-sulfonium phenoxide that is soluble in the polyisocyanate or mixture of polyisocyanates and a carbonylate salt, said components being present in proportions such that the initiator causes the polyisocyanate or mixture of polyisocyanates and the active hydrogen compound to react to form a foamed polymer having both isocyanurate moieties and moieties that are adducts of isocyanate moieties and active hydrogen moieties.

17. An ortho-sulfonium phenoxide represented by the formula:

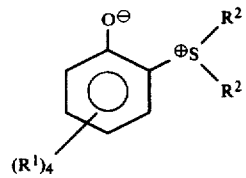

wherein each $R^1$ is independently a suitably inert monovalent radical capable of existing as a substituent on the benzene ring provided that at least one $R^1$ is an organic radical containing at least four carbon atoms; and each $R^2$ is independently a suitably inert monovalent radical and/or two of $R^2$ are collectively a suitably inert divalent organic radical capable of forming a heterocyclic ring with $S^+$.

18. The phenoxide of claim 17 represented by the formula:

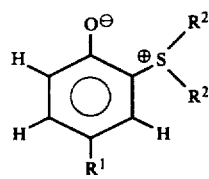

wherein $R^1$ is $C_8$–$C_{12}$ alkyl and each of $R^2$ is individually $C_1$–$C_{10}$ alkyl provided that at least one of $R^2$ is $C_1$–$C_2$ alkyl.

* * * * *